(12) United States Patent
Haeberle et al.

(10) Patent No.: US 10,962,631 B2
(45) Date of Patent: Mar. 30, 2021

(54) METHOD FOR OPERATING A LASER DISTANCE MEASURING DEVICE

(71) Applicant: Robert Bosch GmbH, Stuttgart (DE)

(72) Inventors: Heinz Haeberle, Stuttgart (DE); Uwe Skultety-Betz, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 71 days.

(21) Appl. No.: 16/313,887

(22) PCT Filed: Jun. 14, 2017

(86) PCT No.: PCT/EP2017/064493
§ 371 (c)(1),
(2) Date: Dec. 28, 2018

(87) PCT Pub. No.: WO2018/001730
PCT Pub. Date: Jan. 4, 2018

(65) Prior Publication Data
US 2019/0154818 A1    May 23, 2019

(30) Foreign Application Priority Data

Jun. 29, 2016  (DE) ............... 10 2016 211 742.4

(51) Int. Cl.
*G01S 7/51* (2006.01)
*G01S 17/08* (2006.01)
(Continued)

(52) U.S. Cl.
CPC ............. *G01S 7/51* (2013.01); *G01S 17/08* (2013.01); *G01S 17/86* (2020.01); *G06T 7/521* (2017.01); *G06T 7/55* (2017.01); *H04N 5/445* (2013.01)

(58) Field of Classification Search
CPC ....................................................... G01S 7/51
(Continued)

(56) References Cited

U.S. PATENT DOCUMENTS

2015/0154752 A1* 6/2015 Hirai ..................... G06T 7/32
382/132
2015/0317070 A1* 11/2015 Lammers Van Toorenburg ..........
G01C 15/00
715/771
(Continued)

FOREIGN PATENT DOCUMENTS

DE   10 2012 214 880 A1   6/2013
EP       2 669 707 A1    12/2013
EP       2 918 972 A2     9/2015

OTHER PUBLICATIONS

International Search Report corresponding to PCT Application No. PCT/EP2017/064493, dated Oct. 2, 2017 (German and English language document) (5 pages).

*Primary Examiner* — Eileen M Adams
*Assistant Examiner* — Daniel T Tekle
(74) *Attorney, Agent, or Firm* — Maginot, Moore & Beck LLP (57) ABSTRACT

A method for operating a laser distance measuring device, in particular a hand-held laser distance measuring device, includes determining a first distance from a first target point with a laser distance measuring unit of the laser distance measuring device by emitting a laser beam in a first distance measuring direction. The method further includes subsequently determining at least one second distance from a second intended target point. An image at least of the target environment of the second target point, captured by a camera of the laser distance measuring device, is displayed on a display of the laser distance measuring device. At least one part of a connection line is represented overlapping with (Continued)

the image, and the connection line connects the first target point and the second target point in the displayed image. A laser distance measuring device implements the method in one embodiment.

16 Claims, 6 Drawing Sheets

(51) Int. Cl.
    *G01S 17/86* (2020.01)
    *G06T 7/55* (2017.01)
    *G06T 7/521* (2017.01)
    *H04N 5/445* (2011.01)

(58) Field of Classification Search
    USPC ........................................................ 348/137
    See application file for complete search history.

(56) References Cited

U.S. PATENT DOCUMENTS

2015/0332500 A1   11/2015  France
2017/0071508 A1*   3/2017  Kaiser .................. A61B 5/0077

* cited by examiner

METHOD FOR OPERATING A LASER DISTANCE MEASURING DEVICE

This application is a 35 U.S.C. § 371 National Stage Application of PCT/EP2017/064493, filed on Jun. 14, 2017, which claims the benefit of priority to Serial No. DE 10 2016 211 742.4, filed on Jun. 29, 2016 in Germany, the disclosures of which are incorporated herein by reference in their entirety.

BACKGROUND

The present disclosure relates to a method for operating a laser distance measuring device, in particular a handheld laser distance measuring device.

Methods for operating laser distance measuring devices have already been proposed, for example in DE 10 2012 214 880 A1 or in EP 2669707 A1.

SUMMARY

The proposed method for operating a laser distance measuring device, in particular a handheld laser distance measuring device, proceeds from a method wherein by means of an laser distance measuring unit of the laser distance measuring device, a first distance to a first target point is determined by emitting a laser beam in a first distance measuring direction and then at least one second distance to a second, sighted target point is determined. The second distance is determined by emitting a laser beam in a second distance measuring direction.

According to the disclosure, an image at least of the target environment of the second target point, which image is recorded by means of a camera of the laser distance measuring device, is output on a display of the laser distance measuring device, wherein at least one part of a connecting line connecting the first target point and the second target point in the image that is output is represented in a manner superimposed with the image.

The laser distance measuring unit of the laser distance measuring device is provided for emitting a temporally modulated beam, in particular a laser beam, in a direction toward a target object whose distance to the measuring device is intended to be determined. That point at which the emitted laser beam impinges on the target object is called target point hereinafter. That direction in three-dimensional space in which the laser beam is emitted toward the target object is referred to as distance measuring direction hereinafter. Relative to the laser distance measuring device, the distance measuring direction is defined by the construction, in particular by the arrangement of the laser distance measuring unit in a housing of the laser distance measuring device. The laser distance measuring unit comprises at least one transmitting device for emitting laser radiation. The terms "laser radiation" and "laser beam" are used synonymously hereinafter.

A returning beam reflected or scattered from the target object aimed at is at least partly detected by the laser distance measuring device, in particular by a sensor device of the laser distance measuring unit, and used for determining the distance to be measured in the distance measuring direction. The sensor device is configured for detecting returning laser radiation, wherein the "sensor device" should be understood to mean at least one detector element which supplies a detection signal depending on an impinging light intensity. "Detector element" should be understood to mean radiation-sensitive, in particular light-sensitive, elements such as photodiodes, for example PIN diodes or avalanche photodiodes (APD), but also (modulated) CCD chips and CMOS pixels. In one embodiment of the laser distance measuring device, the at least one detector element is formed by a single-photon avalanche diode (SPAD), preferably by a plurality of single-photon avalanche diodes.

A light propagation time can be determined from a phase comparison carried out between the emitted laser radiation and the laser radiation reflected from the surface of the target object, and the sought distance between the laser distance measuring device and the target object, in particular between the laser distance measuring device and the target point in a corresponding distance measuring direction, can be determined using the speed of light. A typical measurement range of the laser distance measuring device lies in a distance range of from a few centimeters to hundreds of meters. The determined distance, i.e. the distance measurement value, is then further processed by means of an evaluation or control device of the laser distance measuring device and/or output to a user of the laser distance measuring device using an output device such as a display.

In one embodiment, the laser distance measuring device is realized as a handheld measuring device that can be guided merely by the hands, preferably by one hand, without the aid of a transport and/or holding device. To that end, the total mass of the laser distance measuring device is in particular less than 500 g, preferably less than 300 g, particularly preferably less than 200 g. In one embodiment of the laser distance measuring device, all the components of the measuring device are accommodated in a housing substantially enclosing the components. In particular, the length of the longest side of said housing is less than 30 cm, preferably less than 20 cm, particularly preferably less than 15 cm.

According to the disclosure, the laser distance measuring device comprises a camera, aligned in particular in the distance measuring direction, for recording at least one image of a target environment of a respectively sighted target point. In one embodiment, the camera can be realized as a CCD chip or some other image capture means, sensitive in particular in the visual spectrum. By means of the camera, in particular at the same time as a measurement of the distance between the laser distance measuring device and a target point on the target object, an image of at least the target environment of the target point can be recorded. The target environment around the corresponding target point is defined in this case in particular by way of that solid or capture angle from which light is gathered and converted into an image by means of the optical system of the camera. In one embodiment, the image of the target environment of a target point can be altered, in particular reduced or magnified, using beam shaping and/or beam directing optical elements, in particular for example using lenses, diffractive elements, mirrors or the like. As an alternative or in addition thereto, the image of the target environment of a target point can also be altered, in particular magnified or reduced, with the aid of software.

It should be pointed out at this juncture that even a part of the image recorded from the target environment of a target point itself again represents an image of the target environment of the target point. Consequently, in the context of this document, any partial segment of an image from the target environment of a target point is also itself deemed to be an image of the target environment of the target point.

Furthermore, the laser distance measuring device comprises a computing unit provided and configured for calculating a distance from a distance measurement by means of the laser distance measuring unit. Furthermore, the computing unit is also provided and configured for calculating a spacing, in particular a spacing to be determined indirectly, from image data of at least one recorded image. In particular, image data recorded by means of the camera can be evaluated with regard to a solid angle using the computing unit. This means that in particular each pixel of an image recorded by means of the camera corresponds to a known solid angle dependent on the angular resolution of the camera optical system used. Said solid angle, if the distance to the target object is known, can be converted into a distance, for example by means of a trigonometrical function. Consequently, distances that can be assigned to a spacing between points situated on the surface of the target object can be determined or calculated indirectly from said image data. By virtue of the fact that the pixel spacing between the two end points—imaged in pixels—of the spacing to be determined indirectly is determined from the image data, the pixel spacing can be fundamentally converted into an actual distance between the target points and the surface using the known angular resolution.

It should be pointed out that this juncture that, in the context of this document, the term "distance" denotes a distance between the laser distance measuring device and the target object, while the term "spacing" denotes a distance between two points situated on the target object, that is to say denotes the distance to be determined indirectly. In this case, the spacing is calculated and corresponds to the length of the shortest connecting line between the two points on the target object, even if said connecting line extends through the target object. The spacing therefore does not take account of a surface structure, such as, for example, projections, depressions or the like.

In one embodiment of the camera, the latter is embodied as a fixed-focus camera, i.e. the camera optical system has an invariable, fixed magnification or zoom level. In an alternative embodiment of the camera, the latter can have a variable zoom level, i.e. a zoom functionality. Preferably, associated angular distortions for the different zoom levels are known and stored in the device.

The laser distance measuring device additionally comprises a display, wherein an image captured by the camera or a partial region of an image representable by means of the display. In this case, during the operation of the laser distance measuring device, at least one part of a connecting line connecting the first target point and the second target point in the image that is output, in particular that partial region of the image which is output, is representable in a manner superimposed with the image.

The method according to the disclosure for operating the laser distance measuring device finds application for example in a scenario in which a user of the laser distance measuring device would like to carry out an indirect spacing measurement. Such an indirect spacing measurement can be carried out for example if there is no line of sight between the two target points between which the actual spacing is intended to be determined and/or one of both of said target points are/is inaccessible to the user of the laser distance measuring device.

In one application example, by way of example, the user of the laser distance measuring device might be interested in determining an actual spacing between two windows in a house façade, wherein the windows are situated at a height that makes it impossible for the user directly to reach the respective end points of the desired (indirect) spacing measurement.

The proposed method assumes that the user of the laser distance measuring device firstly defines a first distance measuring direction in three-dimensional space by the user firstly sighting a first target point—i.e. the start point of the indirect spacing measurement between the windows. Sighting is carried out, for example, by the user observing an image (or partial image) of the (sighted) target environment on the display of the laser distance measuring device and bringing the laser beam emitted in the distance measuring direction to congruence with the desired first target point by aligning the laser distance measuring device in space. In one embodiment of the method, the user confirms the effected sighting of the first target point by a user input. Following the user input, a first distance in the first distance measuring direction to the first target point is thereupon measured and evaluated. In a temporal relationship, in particular simultaneously with the measurement of the first distance, the camera captures a first image of the target environment of the first target point.

The user of the laser distance measuring device then sights the second target point—i.e. the end point of the indirect spacing measurement. After the sighting or alternatively also continuously during the sighting of the second target point, in particular after a renewed user input, a second distance measurement is carried out between the laser distance measuring device and the second sighted target point in the second distance measuring direction then present. In a temporal relationship, in particular simultaneously with the measurement of the second distance, the camera captures a second image of the target environment of the second target point. An image at least of the target environment of the second target point that is recorded by means of the camera of the laser distance measuring device is output on the display of the laser distance measuring device. At least one part of a connecting line connecting the first target point and the second target point in the image that is output is represented in a manner superimposed with said image, or at least in a manner superimposed with a part of said image. Said connecting line graphically represents the indirect spacing measurement. In this way, from the image that is output, the user can infer that connecting line between the first and second target points which represents that spacing in the image which is or was determined by means of the indirect length measurement.

Particularly intuitive and thus simple operation of the laser distance measuring device by the user can advantageously be realized in this way. Incorrect operation of the laser distance measuring device, in particular an indirect spacing measurement carried out incorrectly, can be avoided.

In one embodiment of the method according to the disclosure for operating the laser distance measuring device, the start point and the end point of the connecting line to be represented are calculated using a series of images comprising at least one first image of a target environment of the first target point and at least one second image of a target environment of the second target point, wherein at least adjacent images have in each case at least one common image region.

In particular, the first image of the target environment of the first target point and the second image of the target environment of the second target point can be identical. In this case, the target environment of the first target point and the target environment of the second target point are reproduced in a single image.

In a more general case, the first image is recorded from the target environment of the first target point after the sighting of the first target point. The laser distance measuring device is then moved in space by the user until the second target point is sighted. A series of further images are recorded during this movement of the laser distance measuring device in space. With the sighting of the second target point, at least one second image of the target environment of the second target point is recorded. From these images, i.e. the first image of the target environment of the first target point, the second image of the target environment of the second target point, and the series of images that were recorded between sighting of the first target point and sighting of the second target point, the information for the indirect spacing measurement can be determined. For this purpose, the images are firstly related to one another by means of an image processing routine by the computing unit. Here the adjacent images of the series of images have in each case a common image region. Using these common image regions, also called "overlap regions", by way of which the images are related to one another, a composite overall image is calculated. This process is known from image processing as "stitching". The start point and the end point of the connecting line to be represented on the display can then be determined using said composite overall image from the pixel coordinates of a pixel grid underlying or taken as a basis for the overall image. In this way, it is possible to realize a particularly simple determination of the start point and the end point of the connecting line to be represented using the images recorded by means of the camera.

In one embodiment of the method for operating the laser distance measuring device, the representation of the image in a manner superimposed with the connecting line between the first target point and the second target point takes place in real time synchronously with a movement of the laser distance measuring device.

In this way, a current image of the target environment of the second target point that is sighted at the given point in time is always output during the movement of the laser distance measuring device by the user. The connecting line between the first target point and the second target point is also represented in an updated manner simultaneously with the updated outputting of the image.

In this context, "in real time synchronously with a movement of the laser distance measuring device" should be understood to mean, in particular, that the processing speed of the computing unit is high enough that a repositioning of the laser distance measuring device in space by the user results directly in a change in the represented image, in particular in a manner superimposed with the connecting line. In this way, the user of the laser distance measuring device can assign a movement in space that is carried out with the laser distance measuring device directly to, i.e. "synchronously" with, a change in the image that is output together with the connecting line.

Advantageously, the representation of the image in a manner superimposed with the connecting line on the display is limited only by a device-internal processing rate, i.e. in particular by device-internal signal transmission speeds and also an evaluation speed of the computing unit. The computing unit is provided in particular for accepting from the camera image data respectively currently recorded and communicated by the camera. In this case, the speed at which image data are accepted by the computing unit is advantageously adapted to a processing speed of the computing unit. Consequently, image data that cannot be processed directly by the computing unit are disregarded.

As a result of a high processing rate, the user of the laser distance measuring device can be given the impression that image data for a target region sighted by the laser distance measuring device, in particular of a target environment of a target point, are evaluated directly and the connecting line between the first target point and the sighted second target point is represented directly. In particular, the laser distance measuring device conveys to the user the impression that the processing of the image data and the calculation of the connecting line to be represented thus take place at least substantially without any delay. A representation of the image in a manner superimposed with the connecting line "in real time" should be assumed if the device-internal processing duration until the completed representation of the image in a manner superimposed with the connecting line is in particular less than two seconds, preferably less than one second, particularly preferably less than 0.5 second. As a result, the target points between which the connecting line is currently calculated can be recognized by the user of the laser distance measuring device particularly rapidly, without any delay and thus with certainty. A particularly efficient and intuitively operable laser distance measuring device having high operating convenience can thus advantageously be provided.

In one embodiment of the method for operating the laser distance measuring device, the spacing between the first target point and the second target point is calculated using a pixel spacing between the first target point and the second target point, said pixel spacing being determined from images related to one another, and also using the first distance.

Advantageously, from the measurement variables of the first distance and the pixel spacing between the first target point and the second target point, the actual, indirect spacing between the first target point and the second target point on the target object can be calculated using a trigonometrical function (for example the law of cosines). In this case, the pixel spacing between the first target point and the second target point is determined from the images related to one another. In this way, it is possible to carry out a particularly fast and simple calculation of the indirect spacing between the first target point and the second target point on the target object, which calculation can be carried out in particular without a complex computing unit.

In one embodiment of the method for operating the laser distance measuring device, the spacing between the first target point and the second target point is calculated using a pixel spacing between the first target point and the second target point, said pixel distance being determined from images related to one another, and also using the first distance and the second distance.

This calculation can likewise be carried out using a trigonometrical function, for example the law of cosines. Using the second distance for calculating the actual, indirect spacing between the first target point and the second target point on the target object, a particularly accurate determination of said spacing can advantageously be carried out.

Furthermore, in one embodiment of the method for operating the laser distance measuring device, even further spatial data, in particular solid angle data, can be used for calculating the indirect spacing between the first target point and the second target point on the target object. Said spatial data can be obtained in a simple manner using an inertial sensor system. In this case, the inertial sensor system serves to capture a current alignment of the laser distance measuring device. By way of example, an inertial sensor system can be provided by means of which a rotation of the laser distance measuring device in an arbitrary direction can be detected and evaluated quantitatively. Alternatively or additionally, for this purpose it is possible to use a sensor from a group of sensors comprising at least inclination-, angle-, spacing-, translation-, acceleration- and rate-of-rotation-sensitive sensors.

The accuracy with which the spacing between the first target point and the second target point on the target object is determined indirectly can advantageously be increased. In particular, even translational movements of the laser distance measuring device that can occur during the alignment of the laser distance measuring device in space for the purpose of sighting the second target point can be taken into account in the calculation of the spacing between the first target point and the second target point on the target object.

In one embodiment of the method for operating the laser distance measuring device, the distance between the first target point and the second target point is represented by a length of the represented connecting line between the first target point and the second target point on the display, in particular is represented in real time synchronously with a movement of the laser distance measuring device on the display, preferably is represented as a numerical value.

"Represent on the display" should be understood to mean, in particular, that the length is output to the user of the laser distance measuring device using the display. By way of example, it is possible to effect this outputting with representation of the length as a numerical value in the image (or in the partial image) that represents the second target environment of the second target point. Alternatively or additionally, it is possible to represent the length as a numerical value in a region represented separately from the image in the display. In this way, the user of the laser distance measuring device can acquire, particularly simply and intuitively, the spacing between the first target point and the second target point that is to be determined indirectly.

With the representation of the length of the connecting line in real time synchronously with a movement of the laser distance measuring device, the user can directly track the change in the actual (indirectly determined) spacing between the first target point and the second, sighted target point on the target object, said change being effected owing to the repositioning of the laser distance measuring device in space.

In one embodiment of the method, the outputting of the image at least of the target environment of the second target point in a manner superimposed with the connecting line between the first target point and the second target point and/or the represented length of the connecting line on the display are/is frozen on account of a user input.

A user input should be understood to mean, in particular, actuations of the operating elements of the laser distance measuring device that are carried out by the user. By way of example, a certain operating element can be provided specifically for freezing the outputting of the image and/or the outputting of the represented length of the connecting line on the display upon the actuation of said operating element. In this case, "freezing" means, in particular, that the outputting of the image (or partial image) and/or of the represented length of the connecting line on the display no longer changes in the event of a further movement of the laser distance measuring device in space.

In particular the user input can be realized on account of the triggering of a further distance measurement, in particular the triggering of the distance measurement in the second distance measuring direction to the second target point. In this way, a particularly intuitively understandable method for operating the laser distance measuring device can be specified: after triggering the first distance measurement to the first target point, the user will move the laser distance measuring device in space in order to sight the second target point on the target object. In this case, the user observes the image determined from the second target environment of the second target point synchronously with his/her movement of the laser distance measuring device on the display and also the simultaneously output length of the represented connecting line. This length of the represented connecting line constitutes the actual, indirectly determined spacing between the first target point and the second, sighted target point. Once the user has found the second target point on account of the sighting, the user can freeze the outputting of the image and/or of the represented length of the connecting line on the display by triggering a second distance measurement between the measuring device and the second target point. The length that is output corresponds to the indirectly determined spacing between the first target point and the second target point on the target object.

In one embodiment of the laser distance measuring device, the connecting line is represented as a subdivided scale.

"Subdivided" means that the connecting line has some form of regularities, for example realized as graduations, as interruptions in the connecting line, as symbols, as numerical values or the like. The subdivision of the scale serves for intuitively reading a length of the connecting line even without a numerical value. It is thus conceivable for the connecting line to be realized as a meter scale or a centimeter scale.

In one advantageous embodiment, the subdivision of the scale is variable, in particular automatically variable, preferably variable depending on the length of the connecting line. In this regard, by way of example, in the case of short spacings of a few centimeters, the subdivision of the connecting line can be effected with a centimeter scale, while in the case of larger spacings or larger lengths of the connecting line, a changeover is made to a meter scale for the subdivision. In this way, the user of the laser distance measuring device can also estimate spacings between the first target point and the second target point on the basis of the subdivision of the connecting line in an intuitive and simple manner.

In one embodiment of the method for operating the laser distance measuring device, the image is output on the display in a manner superimposed with the connecting line between the first target point and the second target point in at least two different scalings.

A representation of the image in a manner superimposed with the connecting line in two different scalings, in particular magnifications, can thus advantageously be made available to the user. By way of example, one of the images that are output can have a small scaling, for example can be output without being magnified, while the second outputting of the image on the display in a manner superimposed with the connecting line has a scaling that corresponds to a magnification of the image. An orientation when sighting the second target point can thus be facilitated for the user of the laser distance measuring device. In particular, the user can gain an overview using a small scaling of the image, while the user utilizes a more highly scaled, in particular magnified, representation of the image in a manner superimposed with the connecting line in order to achieve an accurate alignment of the laser distance measuring device with the second target point. In one embodiment of the method, the scaling of at least one represented image (or partial image) can be changed by the user of the laser distance measuring device.

In one embodiment of the method for operating the laser distance measuring device, the first target point and/or the second target point are/is marked, in particular marked by means of a symbol, in the represented image.

In this way, it is possible to effect a particularly intuitive orientation of the user in the image represented on the display. Moreover, an accurate assignment of the first target point and/or the second target point to the represented image can thus be made possible.

Furthermore, a function of the laser distance measuring device is conceivable in which, during the sighting of a second target point, the connecting line automatically "locks on" a distinctive point, for example a projection or the like, that is to say that the connecting line is represented automatically with respect to said distinctive point as assumed second target point. In this way, it is possible for distances that are to be determined indirectly to be determined more rapidly and more accurately. In one exemplary embodiment of the laser distance measuring device, by way of example, such a distinctive point can be determined by an abrupt difference in successively determined distances, which allow for example a shoulder, a projection, an edge or the like to be deduced.

Furthermore, a laser distance measuring device according to the disclosure, in particular a handheld laser distance measuring device, for carrying out the method according to the disclosure is proposed. The laser distance measuring device comprises at least one laser distance measuring unit for non-contact measurement of a distance to a target point, at least one camera aligned in the distance measuring direction for recording at least one image of a target environment of the target point, at least one computing unit for calculating a distance from a distance measurement by means of the laser distance measuring unit and for calculating a distance from image data of at least one recorded image, and a display, wherein, by means of the display, an image captured by the camera is representable in a manner superimposed with at least one part of a connecting line connecting the first target point and the second target point in the image that is output.

As already mentioned, the image represented or representable by means of the display can also be a partial image of an image captured by the camera.

In one embodiment of the laser distance measuring device, provision is made of a bipartite display and/or two displays for outputting the image in a manner superimposed with the connecting line with the first target point and the second target point in two different scalings.

BRIEF DESCRIPTION OF THE DRAWINGS

The disclosure is explained in greater detail in the following description on the basis of exemplary embodiments illustrated in the drawings. The drawings, the description, and the claims contain numerous features in combination. The person skilled in the art will expediently also consider the features individually and combine them into expedient further combinations. Identical reference signs in the figures designate identical elements.

In the figures.

DETAILED DESCRIPTION

Figure 1:
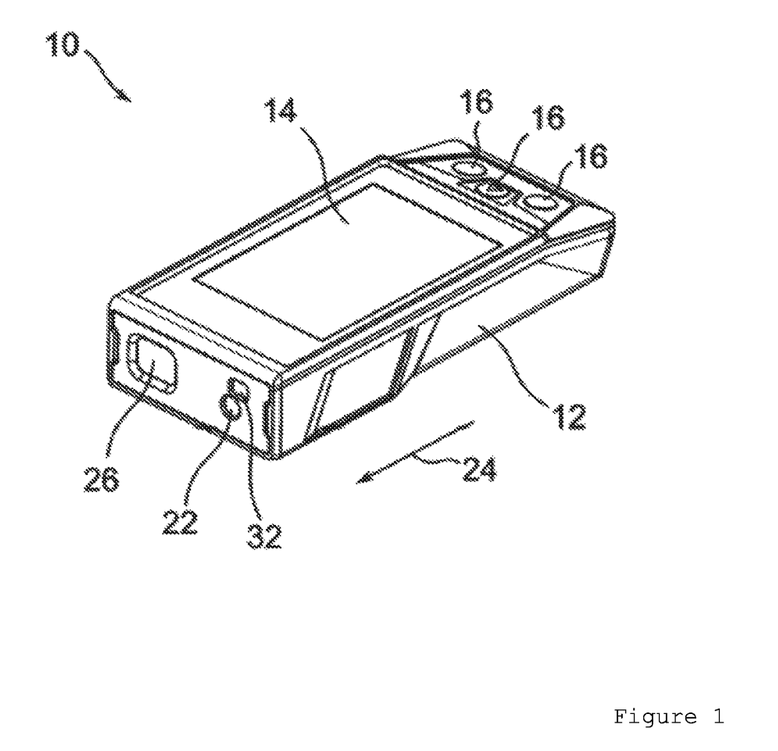
FIG. 1 shows a perspective view of one configuration of the laser distance measuring device according to the disclosure.

FIG. 1 shows, in a perspective illustration, a handheld laser distance measuring device 10 embodied by way of example and comprising a housing 12, a display 14 and also actuation elements 16 for switching the laser distance measuring device 10 on and off and for starting and/or configuring a measuring process. For measuring the spacing between the laser distance measuring device 10 and a target object 18 (cf. FIG. 2a), during the operation of the laser distance measuring device 10, parallel laser radiation 20a, 20b (cf. FIG. 2a) is transmitted via a transmitting optical unit 22, which consists for example of a lens system not illustrated in more specific detail, in the direction of the target object 18. The direction in which the laser distance measuring device 10 emits laser radiation is called distance measuring direction 24, 24a, 24b hereinafter. The laser radiation (not illustrated in more specific detail) reflected from a surface of the target object 18 is guided via a receiving optical unit 26 onto a sensor device (not illustrated in more specific detail) and is detected there. A light propagation time can be determined from a phase comparison carried out between the emitted laser radiation 20a, 20b and the laser radiation reflected from the surface of the distant object 18 and the sought distance 28a, 28b between laser distance measuring device 10 and target object 18 in the distance measuring direction 24, 24a, 24b can be determined using the speed of light. In this exemplary embodiment, the laser radiation 20a, 20b is realized as red laser light. The emitted laser radiation 20a, 20b generates a projected laser point, the so-called target point 30a, 30b, on the target object 18.

According to the disclosure, the laser distance measuring device 10 comprises a camera 32 provided for recording at least one image 34a, 34b of a target environment 36a, 36b of the target point 30a, 30b. In this case, the camera 32 is accommodated in the laser distance measuring device 10 in such a way, in particular accommodated in the housing 12 of the laser distance measuring device 10 in such a way, that it is aligned in the distance measuring direction 24. Consequently, the camera 32 is accommodated in the housing 12 in a positionally fixed manner relative to the housing 12.

The laser distance measuring device 10 comprises, for its energy supply, an energy supply device (not illustrated in more specific detail), in particular a battery or a rechargeable battery, preferably a lithium-ion rechargeable battery. Furthermore, the laser distance measuring device 10 comprises components not illustrated in greater detail in the figures. Said components comprise at least one computing unit for calculating a distance 28a, 28b from a distance measurement and for calculating a spacing 38 to be determined indirectly from image data of at least one recorded image 34a, 34b. The computing unit is configured and provided for carrying out the method according to the disclosure.

Figure 2A:
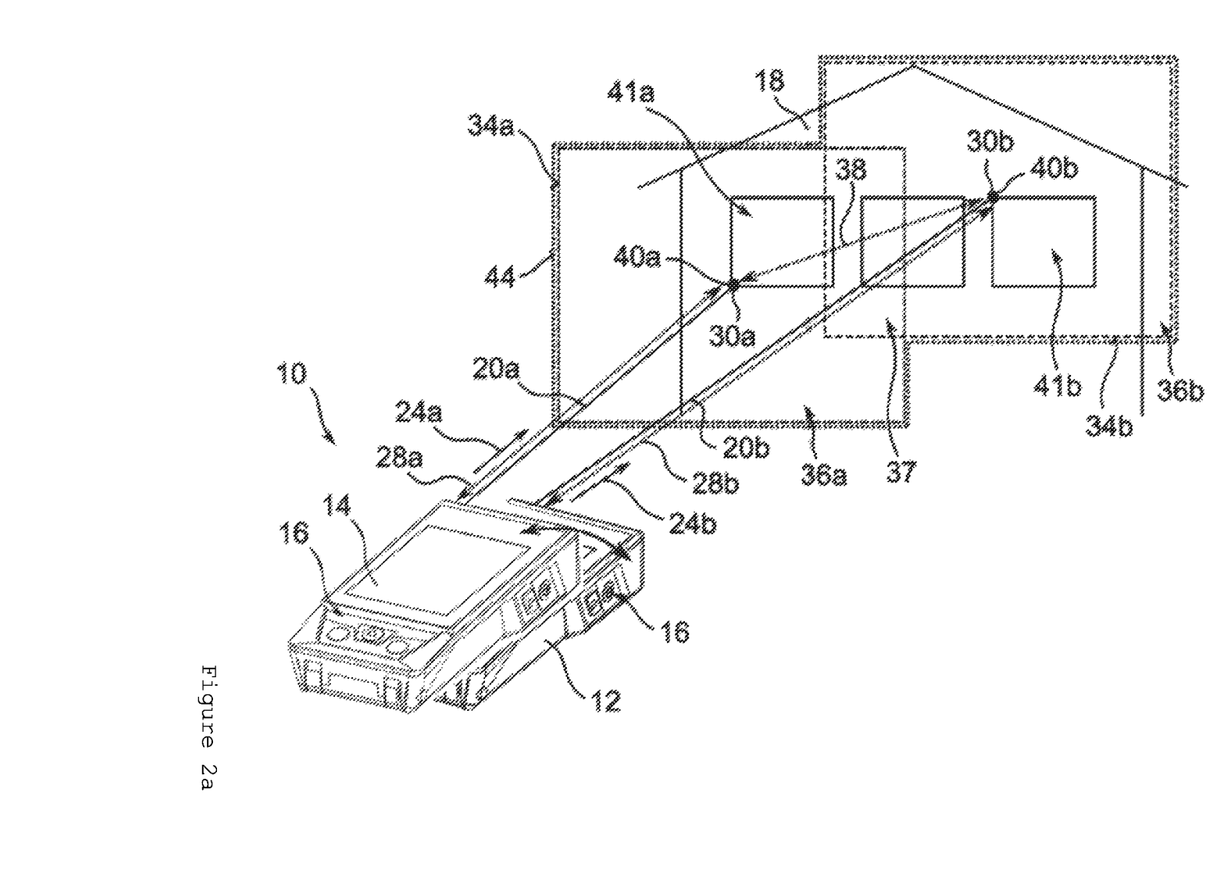
FIG. 2a shows a schematic view of one configuration of the laser distance measuring device according to the disclosure which is situated in an exemplary environment to be measured.
Figure 2B:
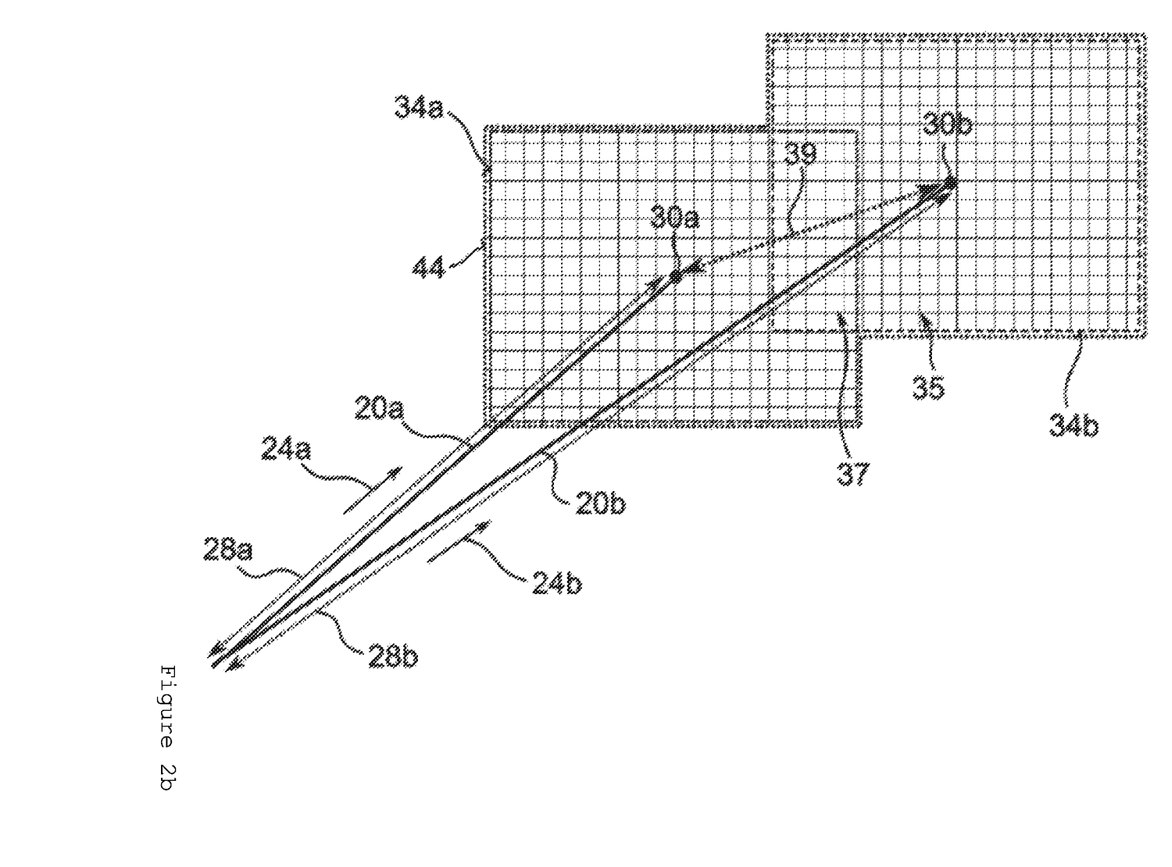
FIG. 2b shows a schematic view of the geometry underlying an evaluation of the spacing, including two images recorded by means of a camera, FIG. 3a,b show schematic plan views of one configuration of the laser distance measuring device according to the disclosure while the method according to the disclosure is being carried out.
Figure 3:
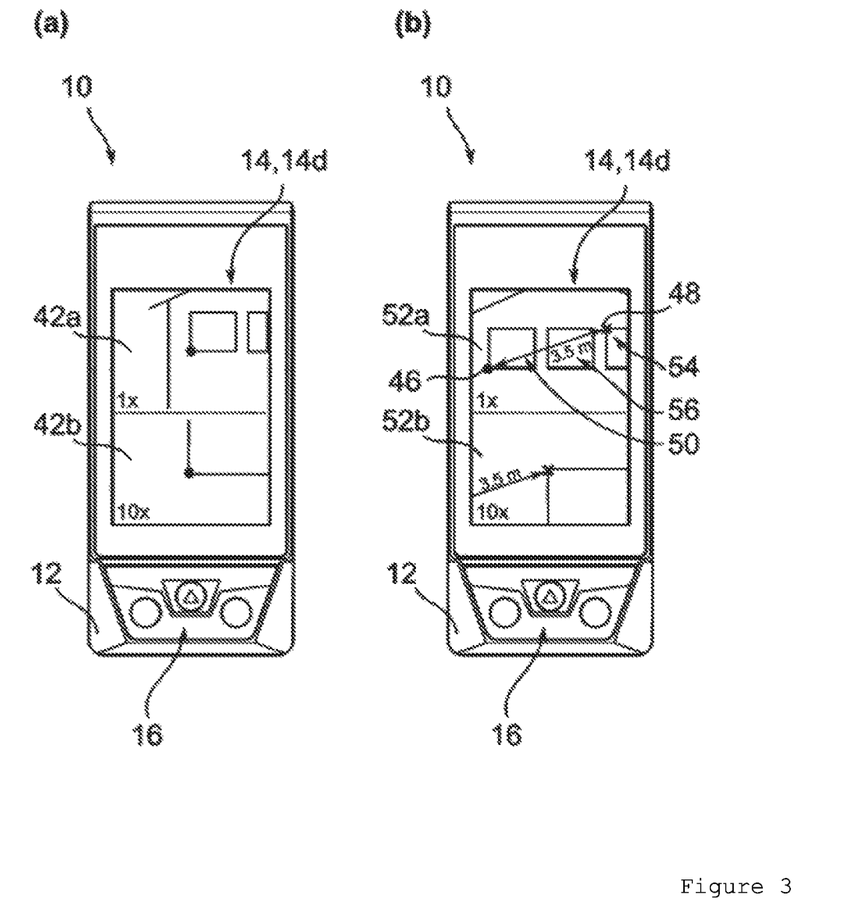

FIG. 2a shows, in a schematic view, a measurement configuration in which the laser distance measuring device 10 is employed using the camera 32. FIG. 2b shows, likewise in a schematic view, the geometry underlying the measurement configuration. In the embodiment shown, the laser distance measuring device 10 is situated in a three-dimensional space. In this case, the laser distance measuring device 10 is aligned in such a way that the distance measuring direction 24a is aligned with the target object 18, represented here as a house. Proceeding from this scenario, the method steps of the method according to the disclosure and their configuration are explained below with reference to FIGS. 2a, 2b, 3 and 4.

In the initial scenario illustrated, a user of the laser distance measuring device 10 is interested in the actual spacing 38 between two corners 40a, 40b of two window frames 41a, 41b. In order to determine the actual spacing 38 on the house façade between these two corners 40a, 40b, the user aligns the laser distance measuring device 10 having the laser beam 20a in a free movement of the laser distance measuring device 10 firstly with respect to the bottom left corner 40a of the window frame 41a (method step 100 in FIG. 4). The free movement is symbolized by a bidirectional arrow in FIG. 2a. The laser beam 20a emitted by the laser distance measuring device 10 generates a first target point 30a in the form of a highly visible, red light point on the surface of the target object 18. At the same time the camera 32 of the laser distance measuring device 10 captures a multiplicity of images of the respective target environment, which are output continuously on the display 14 of the laser distance measuring device 10 and therefore vary like a live image during the movement of the laser distance measuring device 10 in space (method step 102 in FIG. 4; the continuous outputting in the form of a live image is illustrated by an arrow bearing the reference sign 103 in the method diagram in FIG. 4).

It should be noted again that the outputting of an image also includes the outputting of a part of an image, for example of a magnified segment of the image.

In particular, the camera 32 also records the image 34a of the first target environment 36a around the first target point 30a, said image being illustrated in FIGS. 2a and 2b. The image 34a recorded by the camera is illustrated by way of a dash-dotted line in FIGS. 2a and 2b.

The representation reproduced in FIG. 3a is depicted on the display 14 of the laser distance measuring device 10 at this point in time. Via the display 14 of the laser distance measuring device 10, two images 42a, 42b of the target environment 36a are output to the user simultaneously in the embodiment illustrated in FIG. 3a. An unmagnified image 42a of the image 34a—recorded by means of the camera 32—of the first target environment 36a is output in the upper half of the display 14. In the image 42a that is output, the scaling is identified by the text "1×". In this display image 42a, the user sees a segment of the target object 18 and the target point 30a projected onto the target object 18 and represented in the center of the image 42a. Preferably, said target point 30a can also be represented in a superimposed fashion by a symbol. A magnified image 42b of the image 34a—recorded by means of the camera 32—of the first target environment 36a is reproduced in the lower half of the representation that is output by means of the display 14 in FIG. 3a. By way of example, the image 42b that is output in this representation has a magnification of 10-fold, identified by the text "10×". From this image 42b that is output, the user can extract a magnified representation of the image 42a represented in the upper half of the display 14. An accurate alignment of the emitted laser beam 20a with the bottom left corner 40a of the window frame 41a is possible by means of the outputting of the second, magnified image 42b (the precise alignment is achieved in the lower representation; the target point 30a lies exactly on the corner 40a of the window frame 41a).

Figure 4:
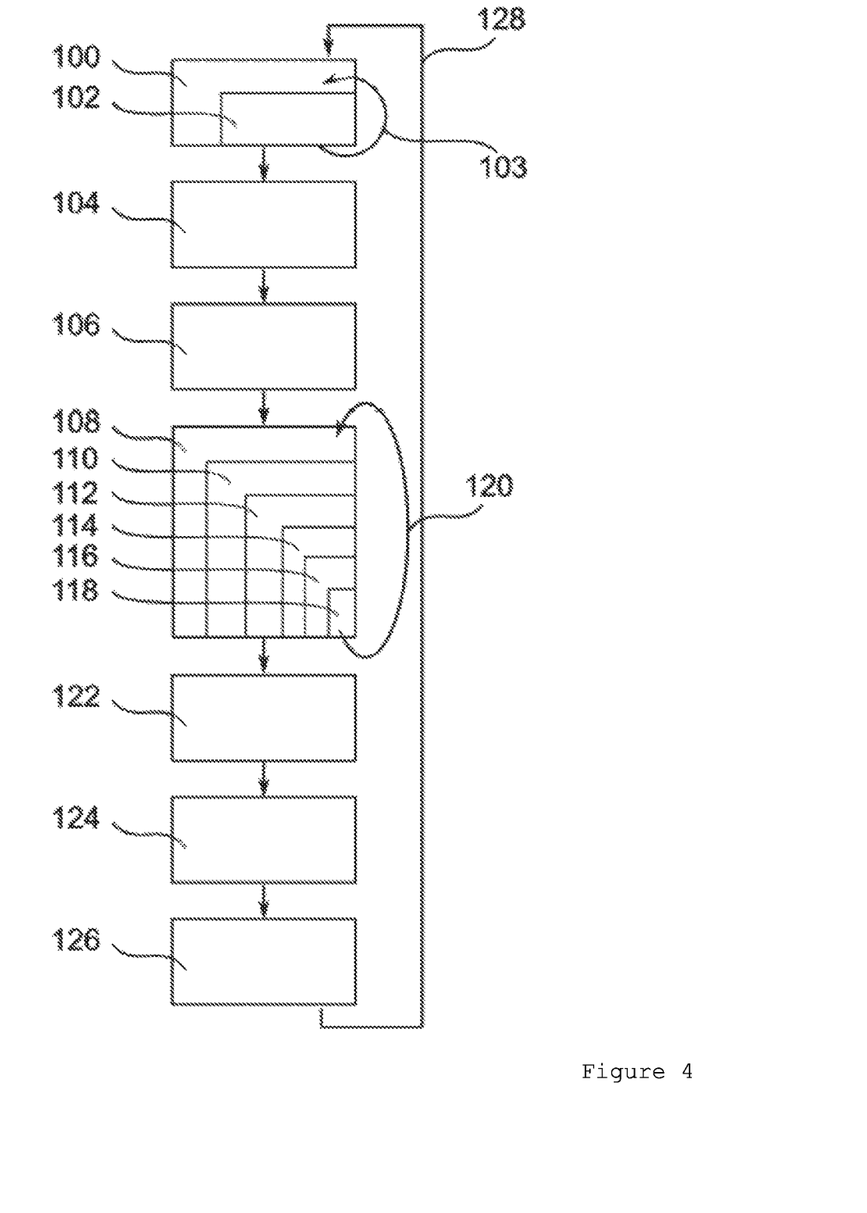
FIG. 4 shows a schematic illustration of the method according to the disclosure in a method diagram.

After sighting the first target point 30a with the laser distance measuring device 10, the user of the laser distance measuring device 10, by actuating an operating element 16 (method step 104 in FIG. 4), initiates the determination of a first distance 28a between the laser distance measuring device 10 and the first target point 30a (method step 106 in FIG. 4). The measured distance 28a is made available to the control device of the laser distance measuring device 10 for further processing. From then on, after the actuation of the operating element 16, all further measurements, in particular the determination of the indirect spacing 38 and an evaluation of recorded image data, are related to the first target point 30a.

The user then moves the laser distance measuring device 10 freely in a three-dimensional space (method step 108) in such a way that the emitted laser beam 20b moves in the direction toward the second corner 40b of the window frame 41b. In this case, the emitted laser beam 20b, in particular the target point 30b projected onto the surface of the target object 18, sweeps over the surface of the target object 18 in the direction toward the second corner 40b of the window frame 41b. During the free movement of the laser distance measuring device 10 in space, the camera 32 progressively records images 34b (here for illustration purposes only one further image 34b instead of a multiplicity of images), which are output to the user as a "live image" of the respectively sighted target environment 36b on the display 14 of the laser distance measuring device 10 (method step 110). The image 34b recorded by the camera 32 is represented by a dashed line in FIGS. 2a and 2b. The temporal frequency with which these images and also the image 34b are recorded is high enough that respectively successively recorded images 34b have at least one overlapping image region (cf. FIGS. 2a, 2b). In this exemplary embodiment, the frequency with which the camera 32 records images 34a, 34b is 50 Hz. In this way, it is possible to ensure that respectively successively recorded images 34a, 34b (or, to put it another way: respectively adjacent images 34a, 34b) have at least one common image region 37.

From the image data obtained from said images 34a, 34b, i.e. from the totality of the images 34a, 34b recorded by the camera 32, a comprehensive evaluation can be carried out using the computing unit (method steps 112 to 118). In particular, the images 34a, 34b are processed by means of the computing unit in such a way that they are respectively related to one another by coordination of the common image region 37 (method step 112). In this way, a panoramic image 44 is put together which consists of at least one image recorded by the camera 32, preferably of a plurality of images recorded by the camera 32 (here two images 34a, 34b). The panoramic image 44 is represented by a dotted line in FIGS. 2a and 2b.

As is illustrated in FIG. 2b, a pixel raster 35 underlies, or a pixel raster 35 is taken as a basis for, the panoramic image 44. In the exemplary embodiment illustrated, the said pixel raster 35 corresponds to the angular resolution of the laser distance measuring device 10 that is defined by the optical system and the CMOS chip of the camera 32. By evaluation of pixels, i.e. in particular by marking of that pixel which marks the first target point 30a in the first image 34a, and of that pixel which marks the currently sighted target point 30b on the target object 18 in the image 34b recorded last, it is possible to determine the start point 46 and the end point 48 of a connecting line 50 to be represented (method step 114).

Using the first distance 28a measured with respect to the first target point 30a and also the pixel spacing (cf. FIG. 2b) between the first target point 30a and the second sighted target point 30b, said pixel spacing being determined from images 34a, 34b related to one another, the actual spacing 38 between the first target point 30a and the sighted second target point 30b can be determined using the law of cosines (method step 116). Alternatively or additionally, the spacing 38 between the first target point 30a and the second, sighted target point 30b can be calculated using the pixel spacing 39 between the first target point 30a and the second sighted target point 30b, said pixel spacing being determined from images 34a, 34b related to one another, and using the first distance 28a and a further distance 28b in the direction of the sighted, second target point 30b. In particular, a greater accuracy of the calculated, indirectly measured spacing 38 between the first target point 30a and the second target point 30b on the surface of the target object 18 can be achieved in this way.

The representation on the display 14 that is output to the user during the movement of the laser distance measuring device 10 in three-dimensional space is illustrated in FIG. 3b. The representation on the display 14 once again comprises two images 52a, 52b. Analogously to the description concerning FIG. 3a, in FIG. 3b once again an unmagnified image 52a (scaling "1×") is output in the upper half of the display 14, and an image 52b magnified ten-fold (scaling "10×") in the lower half of the display 14. The same explanations concerning the usefulness of the representations in different scalings as already explained with reference to FIG. 3a are applicable at this juncture. In a manner superimposed with the images 52a, 52b at least one part of a connecting line 50 is output to the user, wherein the connecting line 50 connects the first target point 30a and the second, sighted target point 30b in the image 52a, 52b that is output (method step 118).

The representation of the images 52a, 52b of the camera image 34b on the display 14 is effected during the movement of the laser distance measuring device 10 in three-dimensional space in real time synchronously with the movement of the laser distance measuring device 10. In particular, the images 52a, 52b that are output are updated (represented by the arrow having the reference sign 120 in FIG. 4) with such a high repetition rate that the outputting on the display 14 seems like a "live image" to the user of the laser distance measuring device 10. At the same time, the connecting line 50 that is output in a manner superimposed with the images 52a, 52b is correspondingly rapidly calculated from the image data and the measured distance 28a to the first target point 30a and is likewise represented.

Advantageously, during the movement of the laser distance measuring device 10 in three-dimensional space, the connecting line 50 appears to the user like a rubber band stretched between the first target point 30a and the second, sighted target point 30b. The second, sighted target point 30b is illustrated in the representation 52a, 52b in FIG. 3b by means of a cross as a symbolic marking 54 of the second target point 30b. With the representation of the connecting line 50, the length 56 of the connecting line 50, in particular the spacing—represented by said connecting line 50—between the first target point 30a and the second, sighted target point 30b on the surface of the target object 18, is simultaneously output to the user.

In FIG. 3b, the output numerical value of said spacing 38 is "3.5 m". The connecting line 50 varies continuously with the movement of the laser distance measuring device 10 in three-dimensional space. At the same time, the length of the connecting line 50 is determined continuously and output as a numerical value 56. In the exemplary embodiment illustrated, the length is represented as a numerical value 56 directly alongside, in particular above or below, the connecting line 50.

Once the user of the laser distance measuring device 10 has attained the desired position on the surface of the target object 18 with the alignment of the laser distance measuring device with the second, sighted target point 30b, the user once again actuates an operating element 16 (method step 122). The display images 52a, 52b represented by means of the display 14 are frozen on account of the actuation of the operating element 16 (method step 124). Even upon further movement of the laser distance measuring device 10 in three-dimensional space, the representation that is output, i.e. the display images 52a, 52b, the connecting line 50 and the represented numerical value 56 for the determined spacing 38, no longer varies. Finally, the measurement result including the images 52a, 52b that are output can be stored using the actuation elements 16 (method step 126).

Following the measurement that has been carried out, the method can be begun anew. This is represented by the arrow 128 in FIG. 4.

Figure 5:
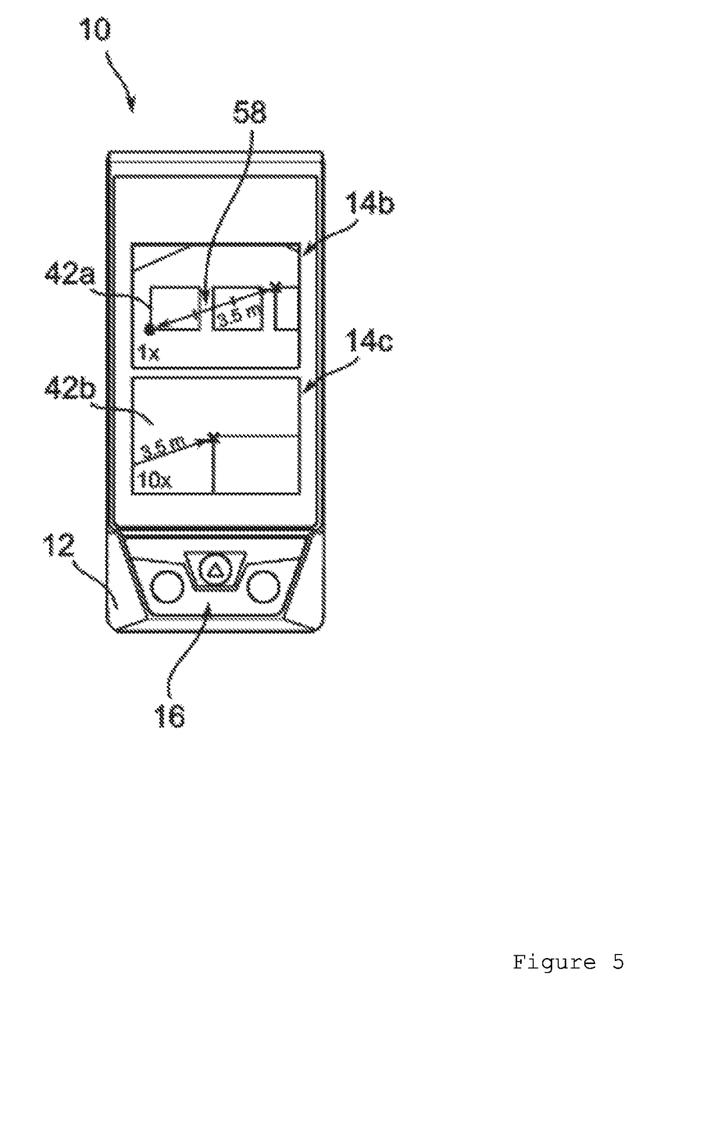
FIG. 5 shows a schematic plan view of an alternative configuration of the laser distance measuring device according to the disclosure while the method according to the disclosure is being carried out.

In the further embodiment of the laser distance measuring device 10 as illustrated in FIG. 5, the connecting line 50 can be output as a subdivided scale 58. The subdivision of the scale allows the user of the laser distance measuring device 10 to make a simplified estimation of spacings on the surface of the target object 18.

Likewise, the outputting of the images 42a, 42b or 52a, 52b (here in FIG. 5 the display images 42a, 42b) to the user can also be effected using two displays 14b and 14c, as is realized in the embodiment of the laser distance measuring device 10 as illustrated in FIG. 5.

The invention claimed is:

1. A method for operating a laser distance measuring device, comprising:
   determining a first distance to a first, captured target point with a laser distance measuring unit of the laser distance measuring device by emitting a laser beam in a first distance measuring direction;
   determining at least one second distance to a second, sighted target point;
   outputting an image at least of a target environment of the second, sighted target point on a display of the laser distance measuring device, the image recorded by a camera of the laser distance measuring device;
   representing in a manner superimposed with the image at least one part of a connecting line connecting the first, captured target point and the second, sighted target point in the image that is output; and
   calculating a spacing between the first, captured target point and the second, sighted target point using (i) the first distance and (ii) a pixel spacing between the first, captured target point and the second, sighted target point, the pixel spacing determined from a panoramic image compiled from a series of images related to one another and comprising at least one first image of a target environment of the first, captured target point and at least one second image of the target environment of the second, sighted target point,
   wherein the representation of the image in a manner superimposed with the connecting line between the first, captured target point and the second, sighted target point takes place in real time synchronously with a movement of the laser distance measuring device.

2. The method for operating a laser distance measuring device as claimed in claim 1, wherein a start point and an end point of the connecting line to be represented are calculated using the series of images, and wherein at least adjacent images of the series of images have in each case at least one common image region.

3. The method for operating a laser distance measuring device as claimed in claim 1, wherein the spacing between the first, captured target point and the second, sighted target point is calculated also using the second distance.

4. The method for operating a laser distance measuring device as claimed in claim 1, wherein the spacing between the first, captured target point and the second, sighted target point is represented by a length of the represented connecting line between the first, captured target point and the second, sighted target point on the display.

5. The method for operating a laser distance measuring device as claimed in claim 4, wherein the spacing between the first, captured target point and the second, sighted target point is represented in real time synchronously with a movement of the laser distance measuring device on the display.

6. The method for operating a laser distance measuring device as claimed in claim 4, wherein the spacing between the first, captured target point and the second, sighted target point is represented as a numerical value.

7. The method for operating a laser distance measuring device as claimed in claim 4, wherein one or more of the outputting of the image at least of the target environment of the second, sighted target point in a manner superimposed with the connecting line between the first, captured target point and the second, sighted target point and the represented length of the connecting line on the display is frozen on account of a user input.

8. The method for operating a laser distance measuring device as claimed in claim 1, wherein the connecting line is represented as a subdivided scale.

9. The method for operating a laser distance measuring device as claimed in claim 1, wherein one or more of the first, captured target point and the second, sighted target point is marked in the represented image.

10. The method for operating a laser distance measuring device as claimed in claim 9, wherein the one or more of the first, captured target point and the second, sighted target point is marked by a symbol in the represented image.

11. The method for operating a laser distance measuring device as claimed in claim 1, wherein the laser distance measuring device is configured as a handheld laser distance measuring device.

12. The method for operating a laser distance measuring device as claimed in claim 1, wherein the image is output on the display, in a manner superimposed with the connecting line between the first, captured target point and the second, sighted target point, simultaneously in at least two different scalings.

13. The method for operating a laser distance measuring device as claimed in claim 1, wherein a pixel raster underlies or is taken as a basis for the panoramic image, the pixel spacing determined with respect to the pixel raster associated with the panoramic image.

14. The method for operating a laser distance measuring device as claimed in claim 13, wherein a start point and an end point of the connecting line to be represented are determined by (i) marking a first pixel of the pixel raster that marks the first, captured target point in the first image and (ii) marking a second pixel of the pixel raster that marks the second, sighted target point in the second image.

15. A laser distance measuring device, comprising:
at least one laser distance measuring unit configured for non-contact measurement of a distance to at least one, captured target point;
at least one camera aligned in a distance measuring direction and configured to record at least one image of a target environment of the at least one, captured target point;
at least one computing unit configured to calculate (i) respective distances to at least two target points from respective distance measurements by the laser distance measuring unit and (ii) a spacing between the at least two target points using a pixel spacing between the at least two target points, the pixel spacing determined from image data of one or more recorded images comprising respective target environments of the at least two target points; and
a display via which an image captured by the camera is representable in a manner superimposed with at least one part of a connecting line connecting the at least two target points in the image that is output,
wherein the representation of the image in a manner superimposed with the connecting line between the at least two target points takes place in real time synchronously with a movement of the laser distance measuring device, and wherein the at least two target points include the at least one, captured target point and at least one, sighted target point.

16. The laser distance measuring device as claimed in claim 15, further comprising one or more of two displays and a bipartite display configured to output the image in a manner superimposed with the connecting line between the at least two target points in two different scalings.

* * * * *